UNITED STATES PATENT OFFICE.

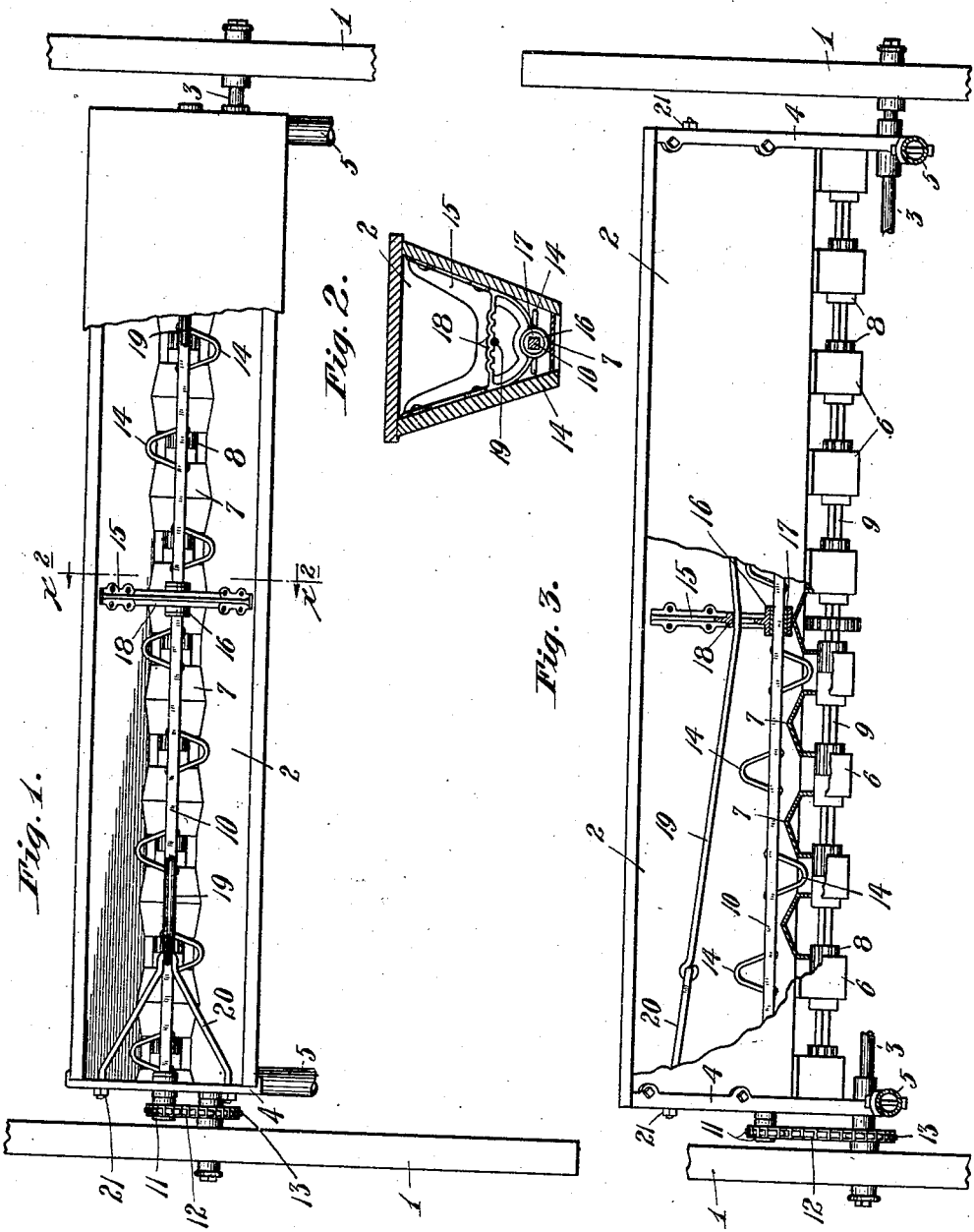

SPENCER E. DAVIS, OF MINNEAPOLIS, MINNESOTA.

DRILL AND SEEDER.

No. 898,562.  Specification of Letters Patent.  Patented Sept. 15, 1908.

Application filed November 2, 1905, Serial No. 285,643. Renewed November 19, 1906. Serial No. 344,153.

*To all whom it may concern:*

Be it known that I, SPENCER E. DAVIS, a citizen of the United States, residing at Minneapolis, in the county of Hennepin and State of Minnesota, have invented certain new and useful Improvements in Drills and Seeders; and I do hereby declare the following to be a full, clear, and exact description of the invention, such as will enable others skilled in the art to which it appertains to make and use the same.

My present invention relates to drills and other seeding machines and has for its object to improve the same in the several particulars hereinafter noted.

The invention consists of the novel devices and combination of devices hereinafter described and defined in the claims.

In the accompanying drawings which illustrate my invention, like characters indicate like parts throughout the several views.

Referring to the drawings: Figure 1 is a plan view with some parts broken away, showing the hopper and wheels of a drill and illustrating the manner in which the several features of my invention are applied thereto. Fig. 2 is a transverse section on the line $x^2 x^2$ of Fig. 1 and Fig. 3 is a rear elevation of the parts shown in Fig. 1, some parts being broken away.

The numeral 1 indicates the wheels and the numeral 2 the hopper of the drill. The wheels 1 are loosely mounted on an axle 3 and the hopper 2 is provided with end brackets or plates 4 that are rigidly secured to the axle 3 and to the machine frame 5, portions only of which latter are shown. In its bottom, the hopper 2 opens into a plurality of feed cups 6 that are united by bridge portions 7. Feed cylinders and gates 8 are mounted in the feed cups 6 in the usual way, and a squared or angular driving shaft 9 is passed through all of the said feed cups, cylinders and gates.

Mounted in suitable bearings in the end plates or brackets 4 of the hopper 2 and extending longitudinally through said hopper in a vertical line with and just above the feed cups 6, is an agitator shaft 10, which, at one end, is provided with a sprocket 11. This shaft 10 receives rotary movement under the advance movements of the machine through a sprocket chain 12 that runs over the sprocket 11 and over a sprocket 13 that is carried by the hub of one of the wheels 1.

In vertical line with each cup 6, the shaft 10 is provided with a U-shaped or approximately U-shaped agitator 14, the legs or prongs of which, at their ends, are rigidly secured to said shaft 10. The bows or outermost portions of these agitating members 14, under the rotary movement of the shaft 10, are arranged to pass slightly into the open upper portions or mouths of the feed cups 6 and to keep the seed stirred up or agitated at such points and thereby insure the complete filling of the said cups with seed at all times. The agitating members 14 are preferably made of stiff wire which is of no greater diameter than actually required for strength. Furthermore, as the agitators 14 are secured at both ends, each may be of much smaller wire than if secured only at one end. A small wire, it has been found, will do much better work than a large wire, because in passing through the grain, it will not act as a paddle to force the seeds out of the feed cups, but will pass freely through the seed, while at the same time serving to keep the seed agitated and insure the free flow thereof into the feed cups.

The above described arrangement whereby the approximately U-shaped agitators are caused to work above, but to work slightly into the upper open portions of the feed cups is especially important in the sowing of what is known as "Texas" oats, or other oats which have a long beard that prevents them from being readily packed together. The improved agitator, it has been found in practice, will press these bearded oats downward into the feed cups and cause the latter to be completely filled.

In the present machines, very long hoppers are employed, and these hoppers have a tendency to warp or bulge laterally, and furthermore, they require to be trussed or strengthened so that they will not sag down at their central portions. For meeting these conditions, I provide the improved device which is constructed as follows: To the intermediate portions of the sides of the hopper 2, is rigidly secured a spacing bracket 15 which keeps the sides of the hopper properly spaced, and which, as shown, is also provided with a bearing hub 16 that supports the central portion of the agitator shaft 10. Also, as shown, a bushing 17 is mounted on the central portion of the shaft 10 and works rotatively in the said hub 16. Above the bearing 16, the bracket 15 is provided with a bridge bar 18 that is notched on its under edge for an important purpose which will presently appear.

The numeral 19 indicates a truss rod that bears against the bridge bar 18 and engages with one or the other of the notches. At its ends, the truss rod 19 is attached to yokes or anchoring prongs 20, the ends of which are passed through the end plates 4 of the hopper and are provided with nuts 21, by means of which the truss made up of the rod 19 and yokes 20 may be tightened. The prongs of the particular yoke 20, it will be seen by reference to Fig. 1, have their base of reaction against the adjacent head 4 on the opposite sides of the line of strain of the truss, to-wit, on the opposite sides of the said rod 19. It will also be noted that the bridge bar 18 is located below the points where the prongs of the yokes 20 pass through the heads 4. Hence, it is evident that when the truss is tightened, the central portion of the hopper will be very rigidly supported against sagging or downward movement. It is also evident when the truss rod 19 is engaged with the central notch of the bridge bar 18, the tension of the truss will be thrown vertically upward, but not to one side more than the other. This is the proper position of the truss rod as long as the hopper remains straight. If the hopper should warp or tend to bulge toward one side, it may be drawn back into position and there held by engaging the truss rod 19 with a notch of the bridge bar 18 which is on the opposite side of the center of the hopper from the direction in which the hopper tends to bulge. Of course, the greater the tendency of the hopper to bulge, the greater distance the truss 19 should be offset from the center of the bridge bar 18.

In practice, the novel devices above described have been found extremely efficient for the purposes had in view.

What I claim and desire to secure by Letters Patent of the United States, is as follows:

1. In a drill or seeding machine, the combination with a hopper having its sides rigidly connected by a notched bridge bar, of a truss rod attached at its ends to yokes, the prongs of which are passed through the heads of said hopper, the intermediate portion of said truss rod being engageable with any of the several notches of said bridge bar, substantially as and for the purposes set forth.

2. In a drill or seeding machine, the combination with a hopper having its sides rigidly connected by a bridge bar, of a truss rod attached at its ends to the heads of said hopper, the intermediate portion of said truss rod being engageable with said bridge bar at any one of several points, substantially as and for the purposes set forth.

3. In a machine of the kind described, the combination with a hopper having its sides rigidly connected by a bridge bar, of a truss rod attached at its ends to the ends of said hopper, the intermediate portion of said truss rod being engaged with the intermediate portion of said bridge bar, substantially as and for the purposes set forth.

In testimony whereof I affix my signature in presence of two witnesses.

SPENCER E. DAVIS.

Witnesses:
ARTHUR W. SELONER,
IT D. KILGORE.